Figure 1:
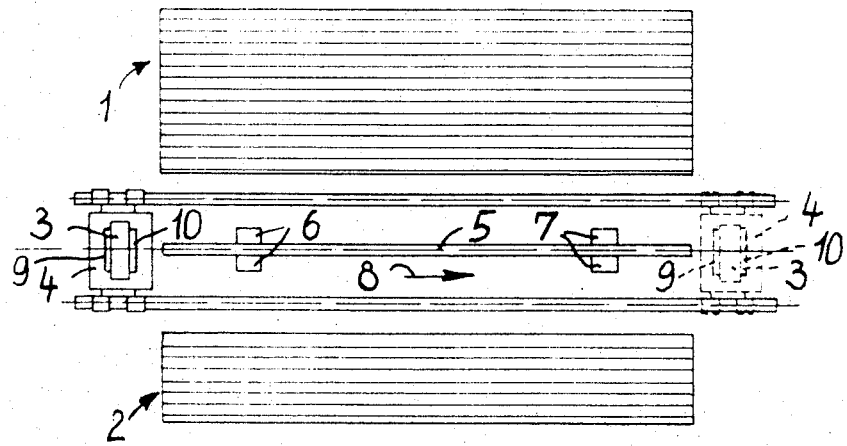

# United States Patent [19]

Lindemann et al.

[11] 3,782,228
[45] Jan. 1, 1974

[54] METHOD AND MACHINE FOR SCALPING ROD STOCK

[76] Inventors: Hans Lindemann, Lindenstrasse 39, Grossdornbert; Wolfgang Lindemann, Im Johannisthal 41, Aachen, both of Germany

[22] Filed: Apr. 13, 1971

[21] Appl. No.: 133,493

[30] Foreign Application Priority Data

May 4, 1970 Germany.................. P 20 21 812.6

[52] U.S. Cl...................... 82/20, 82/1 C, 73/67.8 S
[51] Int. Cl............................ B23b 5/00, B23b 3/00
[58] Field of Search............ 82/20; 73/67.8, 67.8 S, 73/67.9; 29/558, 33 D

[56] References Cited
UNITED STATES PATENTS

| | | | |
|---|---|---|---|
| 3,486,403 | 12/1969 | Schweer et al. | 82/20 |
| 1,973,801 | 9/1934 | Dustan | 82/20 |
| 2,328,002 | 8/1943 | Gall et al. | 82/20 |
| 3,589,218 | 6/1971 | Puck | 82/20 |
| 3,553,570 | 1/1971 | Subiak et al. | 73/67.8 S |
| 3,371,524 | 3/1968 | Wloszek | 73/67.8 S |
| 3,262,123 | 7/1966 | Crouch | 73/67.8 S |
| 2,656,714 | 10/1953 | Cartier | 73/67.8 S |
| 3,121,324 | 2/1964 | Cowan | 73/67.8 S |

Primary Examiner—Harrison L. Hinson
Attorney—Craig, Antonelli and Hill

[57] ABSTRACT

A method and machine for scalping solid or tubular rod stock by means of a cutter head revolving about and movable along a nonrotatable piece of said stock, in which this machine is also provided with at least one flaw testing apparatus which detects the possible presence of flaws in the piece of stock at least during a first scalping run of the cutter head so that during one or more subsequent runs the flaws may be eliminated. The longitudinal movement of the cutter head is preferably reversible at the end of each run and the machine is in this case provided with two flaw testing apparatus each of which searches for flaws remaining in the workpiece after just being scalped in the respective run. Each cutter in the cutter head must then be provided with left and right cutting edges and preferably with an intermediate smoothing edge. If the machine is provided with a flaw testing apparatus which not only detects flaws during the first scalping run of the cutter head but also determines the depth at least of the deepest flaw, the cutters will be adjusted accordingly at the end of the first run, so that during the second scalping run a layer of a sufficient thickness will be removed from the workpiece so as to leave it at least substantially flawless.

11 Claims, 2 Drawing Figures

INVENTORS
HANS LINDEMANN AND
WOLFGANG LINDEMANN
BY:
Craig, Antonelli & Hill
ATTORNEYS

METHOD AND MACHINE FOR SCALPING ROD STOCK

The present invention relates to a method of machining solid or tubular rod stock, especially of steel, by scalping by means of a revolving cutter head, and it further relates to a scalping machine which is designed for carrying out this method.

Although the manufacturers of solid or tubular rod stock would usually prefer to sell such material directly in the form in which it is produced by continuous casting by extrusion, or in rolling mills or the like without being required to machine it except by cutting it to the desired lengths, some of their customers demand such stock to be delivered without flaws and especially without cracks. The manufacturers of the stock are therefore forced to examine at least a part of it to be reasonably certain that it is free of flaws. Before such examinations can be carried out, it is necessary first to scalp the raw stock after being produced since each piece to be tested must not only be absolute straight and true, but coarse surface flaws such as scale or the like must also be removed. Although special machines are known for testing rod stock for surface flaws and especially cracks independently of the scalping machine, these testing machines are relatively expensive and take up considerable space. Since it has been found by experience that a test for surface flaws may be omitted if a relatively thick layer is removed from the raw stock, most manufacturers prefer to do this and take into account that once in a while complaints are made by their customers against some of their deliveries because even though a relatively thick layer has been removed from each piece, for example, of an order of 100 rods, there may be one or two rods which still contain cracks or other flaws. Generally it has been the practice to remove approximately 5 to 9 percent of the cross-sectional size of the raw stock and rather to take this considerable loss of material into account than to test the stock before its delivery to a customer since this would require the investment of high sums of money for one or several testing machines as well as considerable time for carrying out the tests.

It is an object of the present invention to provide a method of scalping solid or tubular rod stock which insures that, while flaws will be removed from the raw stock as much as required, only a minimum of material will be wasted in this scalping operation.

For attaining this object, the invention provides that the rod stock is to be tested for flaws and especially for cracks or the like on the scalping machine itself and while the scalping operation is being carried out. A separate testing machine is therefore no longer required. Moreover, the present invention permits the cutters in the revolving cutter head now to be adjusted so as to cut off only a relatively thin layer of the material. Therefore, after discovering flaws on the rod stock during the first scalping operation, the material may either be scalped once or twice to such an extent that all flaws which have been detected will be eliminated or relatively thin layers may be cut successively off the rod stock until it either complies with the particular requirements or is to be regarded as scrap. The first of these modes of operation may include a so-called "contour scalping" process and also the reduction of the diameter of the rod stock to that diameter at which the deepest flaw will be eliminated. Therefore, regardless of the particular mode of operation in which the new scalping method is carried out, it results in the complete elimination of all flaws, unless they extend too deeply into the material. If certain minor flaws are permitted to remain in the rod stock, its diameter is reduced only to such an extent that the particular requirements will just be fulfilled. Of course, it is also possible to eliminate the largest part of the flaws which have been detected and then to sever the material into two or more pieces at those points where flaws remain which are not acceptable or to remove the faulty material from the scalping machine and to repair it on a separate machine. If the "contour scalping" process is applied, the rod stock is scalped at that spot or those spots where one or more serious flaws were detected until the testing apparatus no longer determines any flaws. If, however, the entire length of a piece of rod stock is to be reduced to a uniform diameter, a testing apparatus must be provided which determines the depth of the flaws and especially the deepest flaws. The measurements which are thus determined are then stored by electronic means and converted into control impulses which then adjust the cutters in the cutter head so that in the second run of the cutter head along the particular piece of rod stock a layer of a thickness will be removed from the surface of this piece which is just in accordance with the depth of the deepest flaws.

If no testing apparatus is available which permits the depth of the flaws to be determined or if for certain reasons the mentioned electronic means are not to be employed, the second mode of operation as mentioned above may be applied according to which several relatively thin layers of the rod stock are to be successively removed until a normal flaw testing apparatus no longer indicates any flaws or until the particular requirements as to the flawlessnes of the material are fulfilled or until it becomes evident that the particular piece of material must be regarded as scrap.

If this last mode of operation is to be applied, it is more advisable to proceed in accordance with the invention by either moving the piece of rod stock or the cutter head back and forth so often on the same scalping machine until the material complies with the requirements or until it must be regarded as scrap rather than to cut off several relatively thin layers successively on several scalping machines which are mounted in a row in axial alignment with each other and the cutters of each of which are set so as to reduce the material to a slightly smaller diameter than it was done on the previous machine. Apart from the high investment for these machines and the large space which they require, they also have the disadvantage that each of them has to be provided with a flaw testing apparatus so as to permit any further scalping operations to be omitted as soon as it has been determined on one of these machines that the flaws of a particular piece of rod stock have been sufficiently or entirely removed so that this piece may then be taken out of the last machine of the row on which it was still necessary to carry out a scalping operation and on which the flawlessness was determined by the associated testing apparatus, whereupon this piece of rod stock may be conveyed to a place in which this and other flawless material is to be deposited. Instead of scalping and testing the material on several successive machines or back and forth on the same scalping machine, the invention may also be carried out by moving the rod stock or the cutter head once through a scalping machine which permits the material to be scalped only in one direction and is provided with only one flaw testing apparatus, and if flaws are discovered during this first operation to scalp the material once more in the same direction on the same scalping machine after the cutters of its cutter head have been readjusted to a smaller scalping diameter. This repeated scalping is then continued until the single testing apparatus no longer detects any flaws or until the scalped material even if not entirely flawless complies with the particular requirements.

In large pipes with a diameter of 50 cm and more it is not always possible or admissible to eliminate flaws by scalping, but it is important to mark any flaws which are detected. While for carrying out such a marking operation it has previously been necessary to employ special apparatus, this may now be carried out according to the method of the invention merely by interrupting for a short time the feed of the scalping machine or by changing its rate of feed when a flaw has been detected by the flaw testing apparatus during the removal of the outer surface layer of the pipe. Such an interruption or change of the feed causes the place of the occurrence of the flaw to be marked on the surface of the large pipe by the difference of its appearance as compared with that of the remaining surface. Insofar as admissible, a flaw which has been detected and then marked in this manner may be eliminated either immediately after being marked or later by a separate operation provided the flaw does not appear to be so serious that it is advisable to eliminate it by severing the pipe at this point into two sections.

From the previous description it is already evident that for carrying out the new method it is one of the features of a scalping machine according to the present invention that it is operatively associated and provided with at least one flaw testing apparatus. These testing apparatus may be of the conventional type as previously employed in special flaw testing machines and consist, for example, of ultrasonic tracers, eddy-current tracers, induction coils, or the like, but it is also possible to associate the cutter or cutters of a scalping machine with at least one instrument for measuring their cutting force or to associate the scalped workpiece with at least one instrument for measuring variations in sliding friction and to connect such an instrument or instruments to certain control elements of the scalping machine by means of amplifiers, monitors, counters, computers, registers or the like.

If the particular flaw testing apparatus or measuring instrument is of a type in which the testing or measuring part is either desired or required to rotate while measuring, it is advisable to mount this part on or within the cutter head of the scalping machine. This has the advantage that the cutter head and the testing apparatus will then automatically comply with the same requirements inasmuch as the cutter head revolves accurately and truly about its axis and also without being affected by vibrations and since it insures that at least at its inside the material scalped or to be scalped extends in a straight direction and is incapable of bending. If the measuring part of the flaw testing apparatus is mounted on a cutter head which is adapted to move back and forth along a rigidly held piece of rod stock and to scalp this piece during its movements in both longitudinal directions, the length of time which is required for eliminating the flaws of this material may be considerably reduced since this material remains in the same position in which it is inserted and clamped into the machine and since it is then only necessary to adjust the cutting diameter of the scalping cutters at the beginning or end of each longitudinal run until one or the other flaw testing apparatus which is associated with the scalping machine indicates that the scalped material no longer contains any flaws or only such flaws which are admissible. It is further advisable to mount at least some parts of the electronic means, such as amplifiers, monitors or the like, on or in the cutter head of the scalping machine so as to be rotatable and axially movable with the cutter head because at least some of the control impulses which are then produced then do not have to be conducted by slip rings from the cutter head to other parts of the scalping machine which are to be controlled by these impulses or to transmitters which are adapted to send these impulses to remote points.

Figure 2:
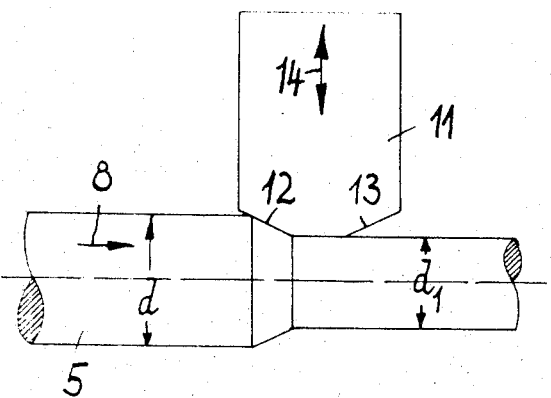

The features and advantages of the present invention will become more clearly apparent from the following detailed description thereof which is to be read with reference to the accompanying diagrammatic drawings, in which:

FIG. 1 shows a plan view of a scalping machine according to the invention the revolving cutter head of which is movable back and forth in its axial directions, while the means for nonrotatably clamping the material to be scalped are mounted in a fixed position; while FIG. 2 shows a plan view of a scalping cutter according to the invention which is provided with cutting edges on its opposite lateral sides for scalping workpieces in either direction or successively in both directions.

Referring first particularly to FIG. 1 of the drawings, the scalping machine according to the invention comprises a rotatable cutter head 3 which is provided with drive means and is mounted on a carriage 4 which is provided with control means for moving it longitudinally in either direction as well as back and forth along guide bars between the opposite ends of a feed rack 1 and a discharge rack 2 which are mounted in fixed positions parallel to each other at the opposite sides of the path of travel of carriage 4. The means for clamping the workpiece 5 so as to be nonrotatable and also not movable in its axial directions comprise jaws 6 and 7 which are adapted to be raised and lowered and to be closed and opened by suitable control means so as to lock and release the workpiece 5. When the carriage 4 is located in one outer end position as shown in full lines, the work piece 5 rests on the jaws 6 and 7 to which it has been moved by a transverse conveying mechanism, not shown. Thereupon at least the jaws 7 but preferably also the jaws 6 are closed so as to lock the workpiece 5 in a nonrotatable position. Carriage 4 may then be moved in the direction of the arrow 8 and during this movement the workpiece 5 is passed through resilient self-closing guide means of a known type which are located in front of the cutter head 3, then through the cutter head and finally through similar guide means which are located behind the cutter head, and it is thereby accurately centered and scalped. Since such resilient self-closing guide means are well known in the art, they are not illustrated. Shortly before the carriage 4 reaches the jaws 6, these jaws are opened and lowered from the workpiece so as to allow the carriage 4 to pass. Workpiece 5 remains, however, in a rigidly locked position by the jaws 7. When carriage 4 is located between the jaws 6 and 7, jaws 6 are again raised and closed so as to grip the workpiece and lock it in a fixed position until the carriage 4 reaches a point near the jaws 7 which are then opened and lowered to permit the carriage 4 to continue its travel to the second outer end position as indicated in dotted lines. After carriage 4 has passed the jaws 7, the latter are again raised and may also be closed for a short time, although this is not absolutely necessary since the workpiece remains rigidly locked by the jaws 6. After the cutter head 3 has passed beyond the end of the workpiece 5, both sets of jaws 6 and 7 are opened so that the workpiece will then merely rest loosely on the lower surfaces of the open jaws. The scalped workpiece may then be passed to the discharge rack 2 and the next workpiece to be scalped may be supplied to the jaws 6 and 7, provided only one layer has to be removed by a single scalping operation from the raw workpiece coming from a rolling mill, extruder or the like so as to leave it free or at least substantially free of flaws and especially cracks. Since it must be assumed that once in a while it will be necessary to move the cutter head 3 twice over and along the workpice 5 before it is free or at least sufficiently free of flaws, the cutter head 3 is operatively associated with two flaw testing apparatus 9 and 10 in front of and behind the cutters in the cutter head. When the carriage 4 is then moved in the direction of the arrow 8 to its end position as shown in dotted lines, the testing apparatus 9 checks whether the workpiece 5 which has just been scalped still contains any flaws, for example, cracks, and if this is the case, the carriage 4 will travel from its right end position back to its original left end position and during this movement the workpiece 5 will be scalped again and its new surface will be checked for flaws by the other testing apparatus 10. For reducing the diameter of the workpiece during this second scalping operation, the cutters 11, one of which is shown in FIG. 2, are provided with left and right cutting edges 12 and 13 which are spaced by a smoothing edge from each other, and these cutters 11 must also be adjustable back and forth in radial directions, as indicated by the arrow 14. The difference in diameter $d-d_1$ between the outer surface of the workpiece 5 after being scalped once in one direction and then scalped again in the opposite direction is equal to a so-called "diameter jump" the meaning of which will be apparent from the following description.

Rolling mills supply rod stock, for example, of steel, of diameters of 15.0, 15.5, 16.0, 16.5 mm and so forth up to a diameter of 30 mm. The difference between successive fixed diameters of rod stock is the so-called "diameter jump". This diameter jump of rolled stock amounts to 1 mm between the diameters of 30 to 70 mm, to 2 mm between the diameters of 70 to 80 mm, and to 3 mm upwardly from a diameter of 80 mm, while at diameters of 150 mm and more it amounts to 10 mm.

If the material which is to be scalped and also tested simultaneously or immediately thereafter has a relatively small diameter, the invention provides that during the first scalping operation for removing flaws, a layer of 0.5 mm (counted with reference to the diameter) is removed from the material. If during this first scalping operation it is found that the scalped material still contains flaws, the material is scalped once more and it is also again tested to determine whether any flaws remain. Usually, all cracks are eliminated after two scalping operations and sometimes even a single scalping operation may be sufficient, although it may also occur that the material has to be scalped three times. If even after three scalping operations there still are flaws in the scalped material, this material is usually to be regarded as scrap and to be discarded from a particular order to be delivered, although it may still be used for another order of a thinner material. If an order requires, for example, flawless rolled stock of a minimum diameter of 20 mm, this stock or any pieces thereof may also have a slightly larger diameter. Usually a raw pipe stock may then have, for example, a diameter of 21 mm so that, if all cracks are eliminated in one scalping operation, the material would have a diameter of 20.5 mm. If after this first scalping operation it is found that the stock still contains flaws, for example, cracks of such a depth that it is evident that they could not even be eliminated by a second scalping operation, this piece of material is to be discarded as scrap. Assuming, for example, that a piece of material contains no other flaws except one crack or several cracks either closely adjacent to each other or spaced at a considerable distance from each other, it may be advisable to mark the spots where these flaws are located and to cut the workpiece apart at these points so as to form two or more pieces of a shorter length.

Apart from carrying out the invention in the manner as previously described and illustrated in the drawings, it is also possible to carry it out in another manner, for example, by scalping and testing the material once or several times in only one direction in the same scalping machine which is provided with only one flaw testing apparatus. It is, however, also within the concept of the invention to mount several one-way scalping machines in a row behind each other, each of which is provided with a flaw testing apparatus. Such a solution is, however, seldom advisable because of the high investment for these machines and the large space which they require. These disadvantages may, however, be compensated if the individual scalping machines are also provided with means for supplying each of them with raw stock to be scalped and with means for discharging and conveying away the stock after it has been scalped. Such a manner of production may be advisable if it is found that the material to be scalped generally contains relatively few flaws because instead of passing the same stock successively through several machines of the row of axially aligned scalping machines, it is then possible to load each individual scalping machine of the row with new stock to be scalped.

If at least the first flaw testing apparatus of a reciprocating scalping machine or the testing apparatus of the first of several one-way scalping machines behind each other is not merely adapted to detect the presence of flaws in a workpiece during the first scalping operation but also to determine the depth to which these flaws extend and especially the depth of the deepest flaw, suitable control means may be provided which are responsive to the measurements of this testing apparatus and will adjust the cutters in the cutter head at the end of the first scalping operation to a scalping diameter in accordance with the depth of the deepest flaw so that during the second scalping operation all of the flaws of the workpiece will be eliminated.

Although our invention has been illustrated and described with reference to the preferred embodiments thereof, we wish to have it understood that it is in no way limited to the details of such embodiments but is capable of numerous modifications within the scope of the appended claims.

Having thus fully declared our invention, what we claim is:

1. A scalping machine for scalping solid or tubular rod stock comprising means for nonrotatably mounting a piece of said stock, a rotary cutter head containing at least one radially adjustable cutter and adapted to revolve about said piece and to scalp the same, means for moving said cutter head and said piece longitudinally relative to each other so as to scalp said piece from one end to the other, and flaw testing means on said machine for detecting flaws which might be present in said piece.

2. A scalping machine as defined in claim 1, in which said flaw testing means are adapted to detect flaws in said piece during said relative longitudinal movement between said piece and said cutter head and at least shortly after any part of said piece has been scalped.

3. A scalping machine as defined in claim 2, in which at least a part of said testing means is located within said cutter head.

4. A scalping machine as defined in claim 3, in which at least said part of said testing means is rotatable with said cutter head.

5. A scalping machine for scalping solid or tubular rod stock comprising means for mounting a piece of said stock in said machine so as to be nonrotatable as well as immovable in its axial direction, a rotary cutter head containing at least one radially adjustable cutter, means for revolving said cutter head about said piece and to move said cutter head back and forth longitudinally from one end of said piece to the other, said cutter in said cutter head being designed so as to be capable of scalping said piece during said longitudinal movement of said cutter head in each direction.

6. A scalping machine as defined in claim 1, in which said means for moving said cutter head and said piece of stock longitudinally relative to each other are adapted to carry out said movement back and forth from one end of said piece to the other, said cutter in said cutter head being designed so as to be capable of scalping said piece during said movement in each direction.

7. A scalping machine as defined in claim 6, in which said cutter has left and right cutting edges and a smoothing edge intermediate said cutting edges.

8. A scalping machine as defined in claim 6, in which said flaw detecting means comprise two flaw detecting devices each being adapted to detect flaws in said piece shortly subsequent to the place of engagement of said cutter with said piece during the scalping action of said cutter in each longitudinal direction.

9. A scalping machine as defined in claim 8, in which said means for nonrotatably mounting a piece of said stock are also adapted to hold said piece in a fixed position in the longitudinal directions thereof, and in which said cutter head is adapted to revolve about said piece and to move along and to scalp the same from one end to the other first in one and thereafter in the opposite longitudinal direction.

10. A scalping machine as defined in claim 1, in which said flaw testing means are adapted to determine the depth of flaws in said piece of stock during a first scalping operation of said cutter along said piece, and control means being responsive to said testing means for radially adjusting said cutter when said first scalping operation is completed in accordance with the depth of the deepest flaw determined so that by a second scalping operation on said piece from either end thereof to the other a layer such a thickness will be removed from said piece that said deepest flaw will be substantially eliminated.

11. A scalping machine as defined in claim 1, further comprising means responsive to said flaw testing means for changing during a scalping operation the relative longitudinal rate of feed between said piece and said cutter head for a short time from the normal rate, whereby the location of a flaw detected by said testing means will be marked on the scalped surface of said piece.

* * * * *